United States Patent [19]

Hirsenkorn

[11] Patent Number: 5,633,368

[45] Date of Patent: May 27, 1997

[54] PARTIALLY ACYLATED β-CYCLODEXTRINS

[75] Inventor: Rolf Hirsenkorn, München, Germany

[73] Assignee: Consortium für elektrochemische Industrie GmbH, Munich, Germany

[21] Appl. No.: 423,887

[22] Filed: Apr. 18, 1995

[30] Foreign Application Priority Data

Apr. 22, 1994 [DE] Germany ............... 44 14 128.9

[51] Int. Cl.$^6$ .................... C08B 37/16; A61K 31/715
[52] U.S. Cl. .................... 536/103; 536/110; 536/124
[58] Field of Search .................... 636/103, 110, 636/124; 514/58

[56] References Cited

U.S. PATENT DOCUMENTS

| | | | |
|---|---|---|---|
| 5,008,386 | 4/1991 | Szabó et al. | 536/103 |
| 5,096,893 | 3/1992 | Pitha et al. | 514/58 |
| 5,183,883 | 2/1993 | Tanaka et al. | 536/6.4 |
| 5,198,429 | 3/1993 | König et al. | 514/58 |
| 5,492,947 | 2/1996 | Wood et al. | 524/48 |

OTHER PUBLICATIONS

Alan P. Croft, Richard A. Bartsch Tetrahedron vol. 39, No. 9, pp. 1417–1474, 1983, Pergamon Press "Synthesis of Chemically Modified Cyclodextrins".

Fang–yu Liu, Dane O. Kildsig, Ashim K. Mitra, "Drug Development and Industrial Pharmacy", 18 (15), 1599–1612 (1992), Complexation of 6–Acyl–O–β–Cyclodextrin Derivatives with Steroids–Effects of Chain–Length and Substitution Degree.

Cyclolab R&D Laboratory Ltd. Budapest, Hungary, Sample Specification ID–No. CY–2002.1 "Acylated β–cyclodextrin" 1993.

CA 117:258209, 1992.

CA 119:145682, 1993.

P. Mischnik New Trends in Cyclodextrins and Derivatives, Dominique Duchene, Chapter 7, "Analysis of the substitution pattern of chemically modified cyclodextrins", Editions des Santes, Paris, no date available.

Klaus Balser et al. "Cellulose Esters", Ullmann's Encyclopedia of Industrial Chemistry, vol. A5, 5th Edition Ed. E. Gerhartz, VCH Verlagsgesellschaft Weinheim 1986, pp. 419–459.

Journal of the American Society, vol. 71, No. 1, Jan. 26, 1949 DC US, pp. 353–356, D. French et al., "Studies on the Schardinger Dextrins", p. 355, right column last para.

Database WPI Week 9407, Derwent Publications Ltd. London, GB An053986 "New (2,3 or 6 or 2,6 or 3,6–acetyl) cyclodextrins" & JP–A–06009709 (Toppan Printing Co. Ltd) Jan. 18, 1994.

Chemical Abstracts, vol. 119 No. 14, Oct. 4, 1993, Columbus, Ohio US Abstract No. 145682j; Uemasu Jsatiu "Trapping of Organic halides using Cyclodextrin derivatives" JP–A–05031212 (Kogyo Gijutsuin), Feb. 9, 1993.

Primary Examiner—Gary L. Kunz
Assistant Examiner—Kathleen Kahler Fonda
Attorney, Agent, or Firm—Collard & Roe, P.C.

[57] ABSTRACT

Partially acylated cyclodextrins of the formula I

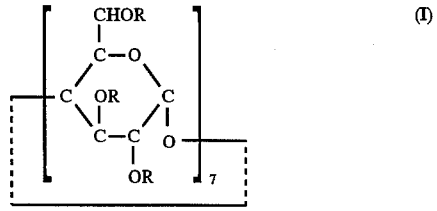

where R denotes hydrogen or R1, wherein R1 can be identical or different and denotes acetyl, propionyl, butyryl, 2-alkoxyacetyl, 2-chloroacetyl, 2-fluoroacetyl, 2-N-acetylaminoacetyl, methacryloyl or acryloyl, and the DS for R1, measured by means of $^1$H NMR spectroscopy, is between 0.30 and 1.20; and a process for preparing partially acylated β-cyclodextrins and also a process for their use.

8 Claims, No Drawings

PARTIALLY ACYLATED β-CYCLODEXTRINS

BACKGROUND OF THE INVENTION

1. Field of the Invention

The present invention relates to partially acylated β-cyclodextrins, to a process for their preparation and to their use.

2. The Prior Art

Cyclodextrins are cyclic oligosaccharides which are assembled from 6, 7 or 8 α(1–4)-linked anhydroglucose units. The α-cyclodextrins, β-cyclodextrins, or γ-cyclodextrins prepared by the enzymic conversion of starch differ in the diameter of their cavity and are generally suitable for enclosing numerous hydrophobic foreign molecules of varying size. Their applications are limited by their low solubilities, especially in the case of β-cyclodextrin, whose solubility in water at 25° C. is 1.8% w/v.

A common method of increasing the solubility of the cyclodextrins is to carry out chemical derivatization on the free hydroxyl groups. Suitable substituents can be introduced on the individual anhydroglucose units at the 2, 3 and/or 6 positions.

Mixtures of substituted cyclodextrins are characterized by their average degree of substitution (DS value). The DS value indicates the number of substituents which are bonded on average per anhydroglucose. The DS value can be determined, for example, by means of $^1$H NMR spectroscopy.

Acylated β-cyclodextrins are disclosed, for example, in A. P. Croft, A. Bartsch, Tetrahedron 39, (1983), pp. 1420–1427.

6-Acyl-β-cyclodextrins are disclosed in K. Mitra, Drug Development and Industrial Pharmacy 18 (15), (1992), 1599–1612. In this publication, the influence of chain length and of the degree of substitution with acyl groups on the complex-forming properties and solubilizing properties of 6-acyl-β-cyclodextrins were investigated using steroids.

Acyl-β-cyclodextrins are also marketed by the company Cyclolab. According to the product data sheet, these compounds contain from 8 to 10 acetyl groups per CD ring, with these acyl groups being predominantly linked to the C6 position of the anhydroglucose. This product thus has a DS of 1.28.

CA 117:258209 and CA 119:145682 also mention the use of acylated cyclodextrins as complexing agents without anything being said about the properties or composition of these cyclodextrin derivatives.

Because of the selective substitution on the O–6 oxygen of the glucoses which is obtained using the known preparation processes, the known acylated cyclodextrins exhibit a comparatively poor solubility and a low capacity for solubilizing substances which are sparingly soluble in water.

SUMMARY OF THE INVENTION

The present invention relates to partially acylated cyclodextrins of the formula I:

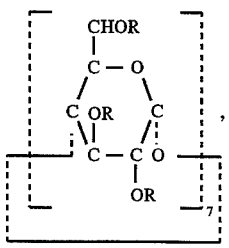

where R denotes hydrogen or R1, wherein R1 can be identical or different and denotes acetyl, propionyl, butyryl, 2-alkoxyacetyl, 2-chloroacetyl, 2-fluoroacetyl, 2-N-acetylaminoacetyl, methacryloyl or acryloyl, and R1 is randomized and the DS for R1, measured by means of $^1$H NMR spectroscopy, is between 0.30 and 1.20.

The randomized substituent distribution in the cyclodextrin derivatives according to the invention is preferably such that the hydroxyl groups in the 6 positions of the glucoses are less than 85%-substituted.

It is particularly preferred that the hydroxyl groups in the 6 positions of the glucoses are less than 80%-substituted. In particular, they are less than 75%-substituted.

Preferably, R1 in formula I denotes acetyl, propionyl, butyryl or 2-chloroacetyl; R1 in formula I particularly preferably denotes acetyl.

The DS for R1 is preferably between 0.8 and 1.2, particularly preferably between 0.9 and 1.1.

The acylated cyclodextrin derivatives according to the invention exhibit a substantially higher degree of solubility in water than do known acylated cyclodextrin derivatives. In addition, the derivatives according to the invention possess an elevated capacity for solubilizing substances, such as, for example, steroids, which are sparingly soluble in water. By virtue of the outstanding solubility both of the cyclodextrin derivatives according to the invention and of the inclusion complexes which are formed using the cyclodextrin derivatives according to the invention, the cyclodextrin derivatives according to the invention can be employed in substantially higher concentrations and, consequently, substantially more foreign compounds can be solubilized. Thus, the acylated β-CD described in Mitra Drug Development and Industrial Pharmacy 18 (15) 1611, FIG. 8 only has a solubility in water of at most 1 mmol/l and a capacity for solubilizing hydrocortisone of from about 1 to 1.8 mmol/l. An acetyl-β-cyclodextrin derivative according to the invention having a DS of 1.0 has a solubility in water of up to 210 mmol/l and exhibits a solubilizing capacity for hydrocortisone of up to 123 mmol/l.

The DS value can be determined, for example, by means of $^1$H NMR spectroscopy in a suitable solvent such as dimethyl sulfoxide/trifluoroacetic acid. In order to determine the DS value, the signals of the acyl groups (int.-ac) and of the sugar protons (int.-zu) are integrated, divided by the number of protons in the acyl substituent or the number of sugar protons, respectively, and then related to each other.

It is also possible to determine the DS from the substituent distribution. On the basis of their structure, cyclodextrins can be substituted at the 02, 03 and/or 06 positions. The DS value can be determined, for example, by methylating the products and subsequently hydrolyzing them into the glucose units and converting these, by reduction and acetylation, into the D-glucitol acetates (P. Mischnick, Analysis of the Substitution Pattern of Chemically Modified Cyclodextrins in Dominique Duchene, New Trends in Cyclodextrins and Derivatives, Editions des Santes, Paris).

Fractionation by gas chromatography gives the molar proportions of the total of 8 theoretically possible glucose units, which are listed below, in the particular cyclodextrin derivatives.

| Number of acetoxy groups | Designation | D-glucitol acetate |
|---|---|---|
| 3 | S2,3,6 | D-glucitol hexaacetate |
| 2 | S3,6 | 1,3,4,5,6-penta-O-acetyl-2-mono-O-methyl-D-glucitol |
| 2 | S2,6 | 1,2,4,5,6-penta-O-acetyl-3-mono-O-methyl-D-glucitol |
| 2 | S2,3 | 1,2,3,4,5-penta-O-acetyl-6-mono-O-methyl-D-glucitol |
| 1 | S6 | 1,4,5,6-tetra-O-acetyl-2,3-di-O-methyl-D-glucitol |
| 1 | S3 | 1,3,4,5-tetra-O-acetyl-2,6-di-O-methyl-D-glucitol |
| 1 | S2 | 1,2,4,5-tetra-O-acetyl-3,6-di-O-methyl-D-glucitol |
| 0 | S0 | 1,4,5-tri-o-acetyl-2,3,6-tri-O-methyl-D-glucitol |

The average degree of substitution of the individual positions can also be calculated from the measured mol % proportions of the respective glucose units. This position is calculated as shown below for X6 (average probability of a substitution in the 06 position):

X6=mol % S6+mol % S2,6+mol % S3,6+mol % S2,3,6;

The average degrees of substitution can be calculated in an analogous manner for substitutions in the 02 and 03 positions. The degree of substitution can also be determined by way of the substituent distribution.

The invention furthermore relates to a process for preparing acylated β-cyclodextrin derivatives, wherein β-cyclodextrin is reacted with at least one acylating agent in the presence of a basic catalyst.

β-Cyclodextrin of commercially available quality and having a water content of between 0% and 16% by weight can be employed in the process according to the invention. For reasons of cost, it is advantageous to use β-cyclodextrin which has a water content of from 10% to 15% by weight, as is commercially available. However, the cyclodextrin can also be prepared in a manner known per se, for example by the enzymic conversion of starch using cyclodextrin glycosyl transferase (CGTase E.C.2.4.1.19).

Carboxylic anydrides or carboxylic acids are preferably employed as the acylating agent. Acetic anhydride, propionic anhydride, butyric anhydride, 2-chloroacetic anhydride, 2-fluoroacetic anhydride, acrylic anhydride or methacrylic anhydride, or the corresponding carboxylic acids, individually or in arbitrary mixture, are particularly preferably employed. Acetic anhydride or acetic acid is employed, in particular.

The alkali metal salts of the acids corresponding to the carboxylic anhydrides, for example sodium acetate, potassium acetate, sodium propionate, potassium propionate, sodium butyrate or potassium butyrate, and/or tertiary amines, such as, for example, triethylamine or pyridine, and/or basic ion exchangers, (such as those sold under the trademark AMBERLYST® A21 or AMBERLITE ®IRA 93 from Rohm & Haas) are preferably employed as the catalyst. Sodium acetate is particularly preferably employed.

It is possible to carry out the acylation directly in the acylating agent without any additional solvent.

It is advantageous with regard to the coloration of the product if dilution is carried out using at least one inert solvent. The designation solvent does not mean that all the reaction components have to dissolve in this solvent. The reaction can also be carried out in a suspension or emulsion of one or more reagents. Examples of suitable inert solvents are acetic acid, propionic acid, butyric acid, formamide, methylformamide, dimethyl-formamide, N-methylpyrrolidone, DMPU (1,3-dimethyl-3,4,5,6-tetrahydro-2(1H)-pyrimidinone), acetamide, methylacetamide or dimethylacetamide.

It is particularly advantageous if, when using carboxylic anhydrides as the acylating agent, the carboxylic acid corresponding to the acylating agent is employed as solvent for the dilution. Thus, for example, acetic acid will be employed as the solvent, if acetic anhydride is used as the acylating agent.

2–30 mol, preferably 3–15 mol, particularly preferably 5–13 mol, of the acylating agent are preferably employed per mole of β-cyclodextrin. In this context, the molar ratios which are employed are in each case selected in accordance with the desired degree of substitution and the water content of the cyclodextrin used.

0.01–3 mol, preferably 0.1–2 mol, of at least one of the said catalysts are preferably employed per mole of β-cyclodextrin.

β-Cyclodextrin and reaction medium are preferably employed in a weight ratio of quantity of β-CD to quantity of reaction medium of from 1:0.5 to 1:10, preferably from about 1:1 to 1:4, with reaction medium being understood to mean the sum of acylating agent and solvent.

In order to prepare the acylated cyclodextrins according to the invention, cyclodextrin, acylating agent, catalyst and reaction medium are added together in the given ratios either simultaneously or consecutively.

The acylating agent is preferably added dropwise to the mixture of the remaining components at an elevated temperature (from about 80° C. to 120° C.) in order to keep the reaction under control.

The reaction mixture, which is a suspension as a rule, is stirred at elevated temperature (temp. from about 80° C. to 150° C.). As a rule, the end of the reaction is characterized by clarification of the reaction mixture, when the initial suspension goes into solution.

The working-up is effected by distilling off the volatile components under a partial vacuum, taking up the residue in water, and evaporating this solution once again under a partial vacuum. These procedural steps are preferably repeated several times, for example three times.

The aqueous solution thus obtained, which contains the partially acylated β-cyclodextrins according to the invention, can be further purified by means of known processes (for example for removing salts or solvent residues by precipitation methods or dialysis) and dried (for example freeze drying or spray drying).

The process according to the invention is thus a simple preparation process without any elaborate purification steps. It makes it possible to prepare acylated CD directly in only one reaction step by means of reacting native CD with acylating agents in the presence of a catalyst.

The process according to the invention is advantageous because, according to the processes previously used in cellulose chemistry (e.g. K. Blaser et al., "Cellulose Esters" in Ullmanns Encyclopedia of Industrial Chemistry, 5th Edition Ed. E. Gerhartz, VCH Verlagsgesellschaft, Weinheim, 1986, pp. 419–459), highly acylated products are normally prepared initially and then subsequently hydrolyzed until the desired degree of substitution is reached.

The process according to the invention avoids the formation of hydrolysis products by circumventing the hydrolysis step and thereby reduces purification problems. It also makes it possible to prepare reaction products which are less colored.

The process according to the invention can be made flexible and generally usable by simple variation of the acyl donor. The process is economical. It operates catalytically, with readily volatile compounds arising as stoichiometric byproducts which can be separated off in a simple manner by distillation. The conversion achieved by this process is quantitative.

Further purification of the cyclodextrin derivatives is effected, if so desired, by processes which are known per se, as, for example, by means of precipitation, ion exchange chromatography, dialysis, column chromatography or preparative HPLC.

The cyclodextrin derivatives according to the invention are suitable for all known applications of cyclodextrins and cyclodextrin derivatives.

The cyclodextrin derivatives of the invention are particularly suitable and have utility

- for solubilizing sparingly water-soluble compounds such as, for example, steroids,
- as formulation adjuvants in pharmaceutical, cosmetic and agrochemical products,
- for stabilizing substances which are sensitive to light, heat or oxidation,
- for defatting and cleaning any surface whatsoever,
- for replacing organic solvents, particularly in the separation and extraction of substances from lipophilic media,
- as auxiliary substances, in particular in coating and/or adhesive lamination in the paper, leather and textile industries,
- as a phase-transfer catalyst
- and also for masking tastes and odors.

DETAILED DESCRIPTION OF THE PREFERRED EMBODIMENTS

Other objects and features of the present invention will become apparent from the following examples considered in connection with the accompanying detailed description of preferred embodiments which discloses several embodiments of the present invention. It should be understood, however, that the examples are designed for the purpose of illustration only and not as a definition of the limits of the invention.

The course of the reactions described in the examples was monitored by means of thin layer chromatography. Prior to the thin layer chromatography, the substances have to be isolated, for example by precipitation with acetone. The DS values mentioned in the examples were determined by means of $^1$H NMR spectroscopy (solvent, dimethyl sulfoxide/trifluoroacetic acid).

EXAMPLE 1

Preparation of acetyl-β-CD (DS 0.99).

200 g (153.3 mmol) of β-CD (13% water) and 6 g (73.8 mmol) of sodium acetate were suspended in 174 ml (1.75 mol) of acetic acid and this suspension was heated to a temperature equal to 105° C. 159 ml (1686 mmol) of acetic anhydride were slowly added dropwise, over a period of about one hour, to the thoroughly stirred suspension. During this procedure, the temperature of the mixture rose to the reflux temperature (117° C.). The mixture was subsequently boiled under reflux, during which period the reaction mixture slowly went into solution. The reaction was complete after about 14 h. The mixture cooled down to room temperature.

50 ml of water were added dropwise to the reaction mixture. The acetic acid was largely removed by rotary evaporation. (T=80° C., 100 mmHg). The product was then dissolved in 200 ml of water and subjected to rotary evaporation. This step was carried out three times in all. Finally, the product was dissolved in 400 g of water. The product thus obtained had a DS of 0.99.

EXAMPLE 2

Preparation of acetyl-β-CD (DS 0.74)

100 g (76.7 mmol) of β-CD (13% water), 55 g (537 mmol) of acetic anhydride, 110 ml of acetic acid and 6 g (73.8 mmol) of sodium acetate were reacted as described in Example 1. The reaction was complete after about 14 h. Further working-up was carried out as described in Example 1. The product had a DS of 0.74.

EXAMPLE 3

Preparation of acetyl-β-CD (DS 0.95)

200 g (135.4 mmol) of β-CD (12.2% water) and 30 g (367 mmol) of sodium acetate were suspended in 700 ml of acetic acid and the suspension was heated to a temperature equal to 117° C. (reflux temperature). The suspension was boiled under reflux, during which period the reaction mixture slowly went into solution (approximately 8.5 h). After that, boiling of the solution was continued until an average degree of substitution (DS) of approximately 1 was reached (about 30 h). This was monitored by taking samples and carrying out NMR analyses. The mixture was cooled down to room temperature.

EXAMPLE 4

Preparation of additional acetyl-β-CD derivatives

Acetyl-β-CD derivatives having DS values of 0.97 and 0.98 were prepared as described in Example 1.

(DS 0.97:1000 g (767 mmol) of β-CD, 860 g (8.44 mmol) of acetic anhydride, 1000 ml of acetic acid and 30 g (369 mmol) of sodium acetate; 117° C.; 17 h)

(DS 0.98:100 g (76.7 mmol) of β-CD, 86.1 g (844 mmol) of acetic anhydride, 80 ml of acetic acid and 6 g (73.8 mmol) of sodium acetate; 105° C.; 20 h)

EXAMPLE 5

Preparation of acetyl-β-CD (DS 0.96) by means of a process embodiment without adding solvent and without metering in the acylating agent 100 g (76.7 mmol) of β-CD (13% water), 86.1 g (844 mmol) of acetic anhydride, 110 ml of acetic acid and 6 g (73.8 mmol) of sodium acetate were mixed at room temperature and heated to 80° C. Owing to the exothermy of the reaction, the mixture heats up to reflux temperature. Boiling under reflux was continued until the suspension clarified. (Duration of reaction, 9 h).

The working-up was carried out analogously to the procedure described in Example 1.

The resulting product had a DS of 0.96.

EXAMPLE 6

Preparation of acetyl-β-CD (DS 0.91) by means of a two-step process 80.2 g (61.55 mmol) of β-CD (13% water) were suspended in 156.5 g (1538 mmol) of acetic anhydride and 0.8 g (9.9 mmol) of sodium acetate and the suspension was heated at 120° C. After 4 h, the mixture became clear. It was cooled down to room temperature. 8 g of sulfuric acid (conc.) in 40 ml of water were then added dropwise and the mixture was heated at 50° C. A further 2 g of sulfuric acid in 10 g of water were added after 8 h. After a further 1 h at 50° C., the hydrolysis was stopped by adding 16 g of sodium acetate and the mixture was cooled down to room temperature. It was then filtered and subjected to rotary evaporation.

The product thus obtained had a DS of 0.91.

The product is clearly browner than the products prepared by the process according to the invention using direct acylation.

Reducing sugars: <0.1%.

EXAMPLE 7

Preparation of propionyl-β-CD (DS 0.90).

100 g (76.7 mmol) of β-CD (13% water), 109.7 g (843 mmol) of propionic anhydride, 6 g (73.8 mmol) of sodium acetate and 100 ml of propionic acid were reacted and worked-up analogously to the procedure described in Example 1. The reaction temperature was 140° C. and the reaction time was 15 h.

The product thus obtained had a DS of 0.90.

EXAMPLE 8

Determination of the substituent distribution in the products prepared in accordance with Examples 1 to 3

5 mg of each of the samples according to Examples 1 to 3 were in each case weighed into a 4 ml reaction vessel sold under the trademark REACTI-VIAL® and made by Pierce Post Office Box 117 Rockford, Ill. 61105 U.S. and 1 ml of trimethyl phosphate was pipetted in. If appropriate, the mixture was dissolved for a short period in an ultrasonic bath.

100 μl of methyl trifluoromethanesulfonate and 150 μl of 2,6-di-tert-butylpyridine were then added and each vessel was provided with a stirrer and sealed well. The mixture was then left to react for two hours in the vessel, which was placed in a water bath at 50° C. The mixture was washed quantitatively into a 50 ml separating funnel using 20 ml of double-distilled water and then extracted once by shaking thoroughly with 5 ml of chloroform.

The lowest layer was drained into a reaction vessel sold under the trademark REACTI-VIAL® and evaporated to dryness at room temperature using $N_2$ gas.

Hydrolysis

The vessel containing the sample from the methylation step was filled with trifluoroacetic acid up to the 4 ml mark, sealed and heated at 110° C. for 4 hours. It was cooled down to about 60° C. and then the trifluoroacetic acid was blown off with nitrogen (to dryness). The residue was treated 3 times with approximately 25 ml of dichloromethane, which was blown off with nitrogen on each occasion.

Reduction 0.25 ml of a 0.5M solution of Na borohydride in $NH_4OH$ was added to the hydrolysis residue and the mixture was heated at 60° C. for at least 1 hour. After cooling down, the excess reagent was destroyed by adding glacial acetic acid until there was no further evolution of gas on shaking. The borate was then removed as methyl borate by repeatedly adding methanol containing approximately 2% acetic acid and then blowing it off with nitrogen: the vessel was filled 6 times up to the 4 ml mark and the mixture then concentrated (almost) to dryness on each occasion.

Acetylation

After cooling, 25 μl of pyridine and 200 μl of acetic anhydride were added. The reaction vessel sold under the trademark REACTI-VIAL® was sealed and placed in a drying oven at 100° C. for 3 h.

After cooling, approximately 1–2 ml of a saturated solution of sodium hydrogen carbonate were added carefully and the vessel was rapidly sealed. 1 ml of $CHCl_3$ and a small volume of $NaHCO_3$ solution were added to a second reaction vessel. The solution from the first vessel was carefully poured into the second vessel, which was sealed, shaken to a certain extent, aerated and then shaken well. The aqueous phase was pipetted off and discarded. The first vessel was rinsed out twice and in this way the process of extracting by shaking was repeated approximately 3 times. $CaCl_2$ was added to the chloroform which had been purified in this way, as was, where appropriate, a small additional volume of $CHCl_3$ as well, and the solution was taken out using a glass tip in order to pipette it into a small glass test tube. The GC analysis was then carried out.

The substituent distribution is given in Table 1.

TABLE 1

| Substituent distribution AC-β-CD | | S0 | S3 | S2 | S6 |
| --- | --- | --- | --- | --- | --- |
| Example 2 | AC-β-CD (0.74) | 32.60% | 3.55% | 0.90% | 53.35% |
| Example 1 | AC-β-CD (0.99) | 23.15% | 4.85% | 0.95% | 51.85% |
| Mitra Comparative Example | AC-β-CD (1.13) | 8.60% | 1.65% | 0.95% | 68.80% |
| Cyclolab product | AC-β-CD (1.28) | 15.20% | 7.55% | 1.55% | 40.35% |

| Substituent distribution AC-β-CD | | S2,3 | S3,6 | S2,6 | S2,3,6 |
| --- | --- | --- | --- | --- | --- |
| Example 2 | AC-β-CD (0.74) | 1.10% | 5.65% | 1.85% | 1.00% |
| Example 1 | AC-β-CD (0.99) | 1.60% | 11.55% | 2.60% | 3.60% |
| Mitra Comparative Example | AC-β-CD (1.13) | 1.15% | 13.15% | 2.20% | 2.70% |
| Cyclolab product | AC-β-CD (1.28) | 3.65% | 19.70% | 3.20% | 7.65% |

| Substituent distribution AC-β-CD | | X2 | X3 | X2,3 | X6 |
| --- | --- | --- | --- | --- | --- |
| Example 3 | AC-β-CD (0.95) | 11.10% | 11.40% | 22.50% | 73.00% |
| Example 2 | AC-β-CD (0.74) | 4.85% | 11.30% | 16.15% | 61.85% |
| Example 1 | AC-β-CD (0.99) | 8.75% | 21.60% | 30.35% | 69.60% |
| Mitra Comparative Example | AC-β-CD (1.13) | 7.00% | 18.65% | 25.65% | 86.85% |
| Cyclolab product | AC-β-CD (1.28) | 17.05% | 39.55% | 56.60% | 70.65% |

EXAMPLE 8

Determination of the solubility in water and of the solubilizing capacity of the products prepared in accordance with Examples 1 to 5 and also of two products from the state of the art The "Mitra product" was prepared in accordance with K. Mitra, Drug Development and Industrial Pharmacy 18 (15), (1992), 1599–1612. The Cyclolab product was purchased from Cyclolab.

The solubility in water was determined at 25° C. For determining the solubilizing capacity, 30% solutions of the acylated cyclodextrins were prepared in water and shaken for 24 h, at 25° C., with an excess of hydrocortisone. Undissolved hydrocortisone was separated off by filtering through a membrane filter (0.2 μm). The hydrocortisone concentration in the filtrate was measured by means of HPLC. The solubilities in water and the solubilizing results are listed in Table 2.

TABLE 2

| Solubilization comparison | | Solubility in water [wt./wt] | Solubilization of hydrocortisone [mg/ml] |
|---|---|---|---|
| Example 2 | AC-β-CD (0.74) | 25.10% | 16.8 |
| Example 1 | AC-β-CD (0.99) | 53.00% | 44.5 |
| Example 3 | AC-β-CD (0.95) | | 40.3 |
| Example 4 | AC-β-CD (0.96) | >70% | 44.7 |
| Example 4 | AC-β-CD (0.98) | >70% | 41.1 |
| Example 5 | AC-β-CD (0.97) | >70% | 43.5 |
| Mitra Comparative example | AC-β-CD (1.13) | <0.6% | cannot be measured |
| Cyclolab product | AC-β-CD (1.28) | 39.60% | 37.2 |

While several embodiments of the present invention have been shown and described, it is to be understood that many changes and modifications may be made thereunto without departing from the spirit and scope of the invention as defined in the appended claims.

What is claimed is:

1. A mixture of acylated cyclodextrins of formula I:

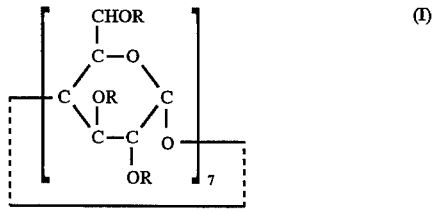

wherein R denotes hydrogen or R1, wherein R1 can be identical or different and denotes acetyl, propionyl, butyryl, 2-alkoxyacetyl, 2-chloroacetyl, 2-fluoroacetyl, 2-N-acetylaminoacetyl, methacryloyl, or acryloyl, and the degree of substitution (DS) for R1, measured by means of $^1H$ nuclear magnetic resonance (NMR) spectroscopy, is between 0.8 and 1.20, wherein the hydroxyl groups in the 6-position of the glucoses are less than 85% substituted, and wherein the seven glucopyranose rings of formula (I) need not be identically substituted.

2. A mixture of acylated cyclodextrins as claimed in claim 1, wherein the hydroxyl groups in the 6-position of the glucoses are less than 80%-substituted.

3. A mixture of acylated cyclodextrin as claimed in claim 1, wherein the hydroxyl groups in the 6-position of the glucoses are less than 75%-substituted.

4. A mixture of acylated cyclodextrins as claimed in claim 1, wherein R1 in formula I denotes acetyl, propionyl, butyryl or 2-chloroacetyl.

5. A mixture of acylated cyclodextrins as claimed in claim 2, wherein the DS for R1 is between 0.9 and 1.1.

6. A process for preparing the mixture of acylated β-cyclodextrins of claim 1, comprising
reacting β-cyclodextrin having a water content of 10% to 15% by weight with an acylating agent in the presence of a basic catalyst.

7. The process as claimed in claim 6, wherein said acylating agent is selected from the group consisting of acetic anhydride, propionic anhydride, butyric anhydride, 2-chloroacetic anhydride, 2-fluoroacetic anhydride, acrylic anhydride, methacrylic anhydride, and the corresponding carboxylic acids, individually or in arbitrary mixture.

8. In a method for solubilizing sparingly water-soluble compounds,
the improvement which comprises,
utilizing the mixture of acylated cyclodextrins of formula I of claim 1 for said solubilizing.

* * * * *